(12) United States Patent
Cailleteau (10) Patent No.: US 7,992,934 B2
(45) Date of Patent: Aug. 9, 2011

(54) SHOCK ABSORPTION DEVICE AND SEAT INCLUDING SUCH A DEVICE

(75) Inventor: Jeremy Cailleteau, Saint Aout (FR)

(73) Assignee: Societe Industrielle et Commerciale de Materiel Aeronautique (SICMA Aero Seat) (FR)

( * ) Notice: Subject to any disclaimer, the term of this patent is extended or adjusted under 35 U.S.C. 154(b) by 260 days.

(21) Appl. No.: 12/469,490

(22) Filed: May 20, 2009

(65) Prior Publication Data
US 2010/0013279 A1    Jan. 21, 2010

(30) Foreign Application Priority Data
May 22, 2008   (FR) ...................................... 08 53339

(51) Int. Cl.
*B60N 2/427*   (2006.01)
(52) U.S. Cl. ................ 297/216.14; 297/216.13; 188/376
(58) Field of Classification Search ............... 297/216.1, 297/216.13, 216.14, 472; 188/371, 374, 188/376, 377
See application file for complete search history.

(56) References Cited

U.S. PATENT DOCUMENTS

| 4,461,492 A * | 7/1984 | Miki ............................. 280/806 |
| 5,219,202 A * | 6/1993 | Rink et al. ................ 297/216.13 |
| 5,242,213 A * | 9/1993 | Fohl ............................... 297/472 |
| 5,597,205 A * | 1/1997 | Glance et al. ............ 297/362.14 |
| 6,024,406 A * | 2/2000 | Charras et al. ........... 297/216.14 |
| 6,053,571 A * | 4/2000 | Faigle ....................... 297/216.13 |
| 7,070,236 B2 * | 7/2006 | Kawashima ............. 297/216.14 |
| 2005/0077763 A1 * | 4/2005 | Kawashima ............. 297/216.14 |
| 2008/0100104 A1 * | 5/2008 | Axelsson et al. .......... 297/216.1 |
| 2010/0176621 A1 * | 7/2010 | Aufrere et al. ............... 296/68.1 |

FOREIGN PATENT DOCUMENTS

| DE | 19613506 | 10/1997 |
| DE | 19807581 A1 * | 9/1998 |
| FR | 2904796 | 2/2008 |

\* cited by examiner

*Primary Examiner* — Peter R. Brown
(74) *Attorney, Agent, or Firm* — Dean W. Russell; Kilpatrick Townsend & Stockton LLP (57) ABSTRACT

The invention relates to a shock absorption device making it possible to tilt the back of a seat frontward in case of a shock greater than a predetermined value, the device including a plate and an absorbing shaft, the plate including a brake cavity and a hole through which the absorbing shaft passes, the hole and the brake cavity being separated by a bridge, and the dimensions of the bridge being such as to break when the stress exerted on the back is greater than a predetermined value. The invention also relates to a seat for a passenger vehicle and, more particularly, an aircraft, the pivotal rotation of which is provided with such a device.

18 Claims, 5 Drawing Sheets

SHOCK ABSORPTION DEVICE AND SEAT INCLUDING SUCH A DEVICE

CROSS-REFERENCE TO RELATED APPLICATIONS

This application claims the benefit under 35 U.S.C. §119 (a) of French Patent Application No. 08 53339, filed May 22, 2008, in the French National Institute of Industrial Property, the disclosure of which is incorporated herein by reference in its entirety.

FIELD OF THE INVENTION

The invention relates to a shock absorption device intended for a seat in a passenger vehicle and more particularly a shock which may occur at the level of the passenger's head. The invention also relates to a seat including such a device and more particularly a seat in an aircraft provided with such a device.

BACKGROUND OF THE INVENTION

In a plane, during a shock, a collision, or a crash, the passengers' heads are projected frontward. When the shock is significant, the passengers' heads may hit the seats in front of them, which may cause serious injuries to the passengers.

It is thus advantageous to have devices making it possible to tilt the backs of the seats frontward in case of a shock in order to reduce the impact of the passengers' heads. In this field, French Patent No. FR 2904796 and German Patent No. DE 19613506 are known, which each disclose a shock absorption device including a first element in the shape of a plate having a hole and a second element inserted into this hole, the first element including a sequence of cuts succeeding along a deformation direction and defining a sequence of bridges, extending along an extension direction transversal with respect to the deformation direction.

Such devices make it possible to absorb the energy of a shock, but they do not make it possible to tilt the seat at a significant angle. In addition, to have efficient shock absorption, it is necessary to from the devices with sequence of complicated cuts and bridges, which are costly and difficult to obtain. In addition, in those devices, it is difficult to control the resisting stress that is opposed by the device. More particularly, because the resisting stress may vary as a function of the behavior of the bridges when they are broken, that stress is difficult to establish when broken bridges form an obstacle for the second element that causes the travel thereof to vary.

SUMMARY OF THE INVENTION

Accordingly, to solve at least the above problems and/or disadvantages described above, and to provide at least the advantages described below, a non-limiting object of the present invention is to provide a shock absorption device that makes it possible to tilt the back of a seat in a vehicle forward in a controlled way with a suitably shaped cavity in case of a shock when the shock is greater than a predetermined value. The device further has the advantage of being simple to produce and of including a limited number of cuts.

More precisely, the invention relates to a shock absorption device including a plate and an absorbing shaft, the plate including a brake cavity and a hole through which the absorbing shaft passes, the hole and the brake cavity being separated by a bridge. In the shock absorption device, the hole includes a central recess in which the absorbing shaft is positioned and two higher and lower crack initiation zones make the bridge locally thinner, the bridge being thinner at the level of one of the crack initiation zones and the dimensions of the bridge being such as to break at the level of the thinner crack initiation zone when the absorbing shaft exerts a stress greater than the predetermined value thereon. The brake cavity includes a central cavity, a storage zone intended to receive the broken bridge, and a deformable zone extending along a longitudinal axis and having a width which is smaller than the diameter of the absorbing shaft, the deformable zone being intended to receive the absorbing shaft when the bridge is broken.

The shock absorption device may, for example, be integrated in the joint of a back of a seat for a vehicle and, more particularly, the back of an aircraft seat. The aircraft seat preferably includes a fixed structure and a back mounted in pivoting relation on the fixed structure using a pivot shaft fixed on the fixed structure about which the back can pivot.

To perform the integration of the invention on the aircraft seat, the plate is fixed on the back so as to be integral with the back, whereas the absorbing shaft is fixed on the fixed structure of the seat. The back is connected to the fixed structure by a pivot shaft about which it can pivot.

Thus, during normal operation, the absorbing shaft blocks the motion of the plate and thus the back cannot pivot about the pivot shaft. In case of a shock, with a value greater than the predetermined value, the stress exerted by the absorbing shaft on the bridge of the plate causes the bridge to break at the level of the thinner crack initiation zone. The bridge then pivots at the level of the other crack initiation zone and is received in the storage zone of the break cavity so that the absorbing shaft is released from the hole in the plate. Thus, the absorbing shaft and the plate are no longer engaged so that the absorbing shaft no longer hinders the motion of the plate/back assembly. The plate/back assembly can then pivot about the pivot shaft which enables the tilting of the back frontward.

In response to a shock of predetermined stress, the bridge breaks and the plate/back assembly first pivots about the pivot shaft without any obstruction since the absorbing shaft then moves to the central recess of the brake cavity. Then, the absorbing shaft meets the deformable zone which has a width that is smaller than the diameter of the absorbing shaft so that the pivoting of the plate/back assembly is slowed down when the absorbing shaft reaches the deformable zone. The absorbing shaft can go further into the deformable zone since the kinetic energy of the shock that moves the plate/back assembly causes the absorbing shaft to deform the walls of the deformable zone and to move further into the deformable zone. The deformation of the deformable zone further makes it possible to absorb the kinetic energy of the shock and to progressively slow down the pivoting of the plate/back assembly. Finally, the absorbing shaft abuts against the end of the deformable zone, which causes the rotation of the plate/back assembly to stop.

Because the width of the deformable zone is smaller than the diameter of the absorbing shaft, the deformable zone stops the rotation of the plate/back assembly without requiring the utilization of a sequence of cuts and bridges as was the case in the prior art. By contrast, the present invention is simple to produce since the plate includes only two cuts—the hole and the brake cavity. In addition, the two crack initiation zones provide a controlled breaking of the bridge and, more particularly, they make it possible to control the place where the bridge breaks and the stress under which it breaks. The storage area contains the broken bridge and avoids its hindering the rotation of the plate/back assembly. The plate may be made of aluminum.

In a preferred embodiment, the bridge is thinner at the level of the upper crack initiation zone than at the level of the lower crack initiation zone, the storage zone of the brake cavity being located at the bottom of the break cavity. Accordingly, when the upper crack initiation zone breaks, the bridge gets folded at the level of the lower crack initiation zone and is driven toward the bottom of the brake cavity by gravity, and thus toward the storage zone. Thus, the broken bridge remains in the storage zone and does not hinder the relative motion of the plate and of the absorption shaft. In addition, if a user wants to return the seat back to upright position after the shock, he or she just has to pull the seat back rearwards. The seat back will return to the upright position very easily since the absorbing shaft is not hindered by the bridge when returning to the original position. Moreover, returning the back to its upright position requires relatively little force because the deformable zone was deformed under the action of the absorbing shaft and the absorbing shaft therefore easily disengages from the deformable zone.

Various embodiments may differ in at least one of the following ways: the reference axis is curved; the deformable zone is curved and it has a length and a curvature such that it makes it possible for the back to tilt along an angle between 40° and 50°; the length of the deformable zone provides a tilting of the back that is sufficient to prevent the passenger's head from hitting the back, and also a correct damping of the shock energy; the deformable zone has a width that is between 80 and 98% of the diameter of the absorbing shaft, which makes it possible for the absorbing shaft to go into the deformable zone while deforming it; the deformable zone has a decreasing width when going away from the bridge along the longitudinal axis such that the motion of the plate about the absorbing shaft is progressively slowed down; the end of the deformable zone is widened when there is not enough kinetic energy to deform the plate significantly when meeting the absorbing shaft at the end of the deformable zone; the central recess of the hole is disk-shaped with a diameter that is substantially equal to that of the absorbing shaft, which allows a correct holding of the absorbing shaft in the hole; for an optimum breaking of the bridge, the central recess has a center located on the reference axis with each of the two crack initiating zones including a center of curvature located on the periphery on the central recess and the two centers being separated by an angle between 80° and 120° with respect to the central recess; each crack initiation zone is concave with a concavity turned towards the central recess; the shock absorption device also includes a mechanism for fastening on a fixed part as well as a mechanism for adjusting the orientation of the absorption device with respect to the part that it is fixed on in order to correct, if need be, the manufacturing defects of the various parts.

The present invention also relates to a seat for a vehicle including a fixed structure, a pivoting shaft fixed on the fixed structure and a back in pivoting relation about the pivot shaft, the seat further including at least one absorbing device according to any one of the preceding embodiments.

Advantageously, the plate is integral with the seat and the absorbing shaft is integral with the fixed structure. Thus, in case of a shock, the absorbing shaft exerts a significant stress on the bridge, which makes it possible to break the bridge so the absorbing shaft then will be released from the recess in which it was engaged and the plate/back assembly will be free to pivot about the pivot shaft. Then the back can be tilted frontward.

According to the present invention, the seat backs can be tilted frontward in response to a shock so as to prevent shock to the passengers' heads and to give way for a stretcher above the seats, if need be.

Advantageously, the back includes at least one connecting rod, one end of which is in pivoting relation about the pivot shaft, with the plate being connected to the connecting rod.

The invention also relates to a seat further including a seating part which can be translated longitudinally with respect to the fixed structure, and a mobile back in annular linear relation with respect to the back, the mobile back being further in pivoting relation about a releasable shaft with respect to the seating part, the pivoting relation between the seating part and the mobile back being provided by a frame integral with the seating part in which the releasable shaft pivots. The frame has an open recess in which the releasable shaft pivots, the shaft being held by a torsion spring releasing the shaft from the recess in the frame when the absorbing shaft of the absorption device pops out of the hole in the plate.

Advantageously, the annular linear relation between the mobile back and the back is provided by a roller integral with a mobile back sliding in an oblong part integral with the back. That pivoting connection between the seating part and the mobile back enables the shock absorption device to be operated even on a seat provided with a variably tilting seat back. The mobile back is integral with a releasable shaft that pivots in an open frame integral with the seating part. The torsion springs holds the releasable shaft in the open recess of the frame during the normal operation of the seat, i.e., in the absence of shock. In case of a shock, the shock absorption device is triggered, which causes the rotation of the fixed back frontward and the roller abuts against the upper part of the oblong part. Thus, the mobile back is driven downward when the absorbing shaft of the shock absorption device goes out of the hole, which causes the releasing of the releasable shaft from the open recess of the frame.

Those and other objects of the invention, as well as many of the intended advantages thereof, will become more readily apparent when reference is made to the following description, taken in conjunction with the accompanying drawings.

BRIEF DESCRIPTION OF THE DRAWINGS

For more clarity, identical or similar elements are referenced with identical reference numbers on all the Figures.

DETAILED DESCRIPTION OF THE EXEMPLARY EMBODIMENTS

The absorption device 1 of the present invention is intended to be positioned on a vehicle seat. In describing the absorption device of the present invention, the adjectives "upper" and "lower" or "up" and "down" are used to indicate the relative position of the various elements when the absorption device is positioned on the seat; the adjective "longitudinal" is used to indicate a direction parallel to the side of the seat; and the adjective "transversal" is used to indicate a direction parallel to the front (or rear) edge of the seat. The plate is parallel to a plane which contains the centers of the various cuts forming the brake cavity 9 and a hole 5 and contains the reference axis 14.

Figure 1:
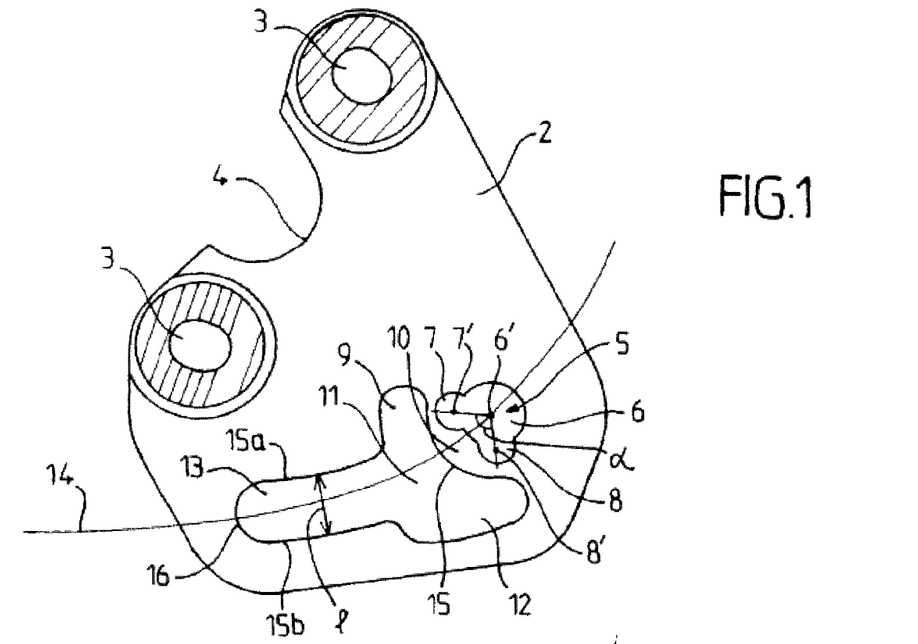
FIG. 1 illustrates an elevational view of a plate of an absorption device according to one embodiment of the invention.

FIG. 1 shows a plate 2 made of aluminum of a shock absorption device 1 according to one embodiment of the present invention. This plate 2 includes two oblong fixing holes 3 and 3' on the upper part thereof, making it possible to fix the plate 2 to the connecting rod 20 of the back of the seat and to adjust the tilting of the device. The fixing holes 3 and 3' are oblong in order to provide clearance to correct for manufacturing defects, if any, in the components of the seat. Adjustment of the tilting of the plate is provided by tightening screws 33 (FIG. 2) to place a knurled surface of the plate 2 in contact with the connecting rod 20. The plate 2 also includes a hole 4 configured to all a pivoting shaft 19 to extend therethrough.

The plate 2 includes a brake cavity 9 and a hole 5 intended to receive the absorbing shaft 17 of the device, the hole 5 and the brake cavity 9 being separated by a bridge 10.

The hole 5 includes a central recess 6 that is disk-shaped in two upper 7 and lower 8 crack initiation zones that make the bridge 10 locally thinner. The central recess 6 has a diameter that is substantially equal to that of the absorbing shaft 17. The crack initiation zones 7 and 8 have the shape of a disk, the centers of which 7' and 8' are located on the periphery of the central recess 6. The centers 7' and 8' of the crack initiation zones are positioned along an angle α approximately equal to 100° with the center 6' of the central recess 6.

The bridge 10 is thinner at the level of the upper crack initiation zone 7 than at the level of the lower crack initiation zone 8 so that the bridge 10 preferably breaks at the level of the upper crack initiation zone 7.

The brake cavity 9 includes a central cavity 11 under which is placed a storage zone 12 intended to receive the part of the broken bridge 10. The bridge 10 is positioned on one side of the central cavity 11 and a deformable zone 13 extending along a curved reference axis 14 is positioned on the other side of the central cavity 11. The deformable zone 13 has a width l that is slightly smaller with that of the absorbing shaft 17. The reference axis 14 is curved and the side walls 15a and 15b on the deformable zone 13 are also curved with the same curvature as the reference axis 14. In addition, the center 6' of the central recess 6 is also located on the reference axis 14. The side 15 of the brake cavity 9 that separates the brake cavity 9 from the bridge is convex and is perpendicular to the reference axis 14, whereas the end wall 16 of the brake cavity 9 that is at the end of the deformable zone 13 is concave. The end wall 16 of the brake cavity 9 is also perpendicular to the reference axis 14.

Figure 2:
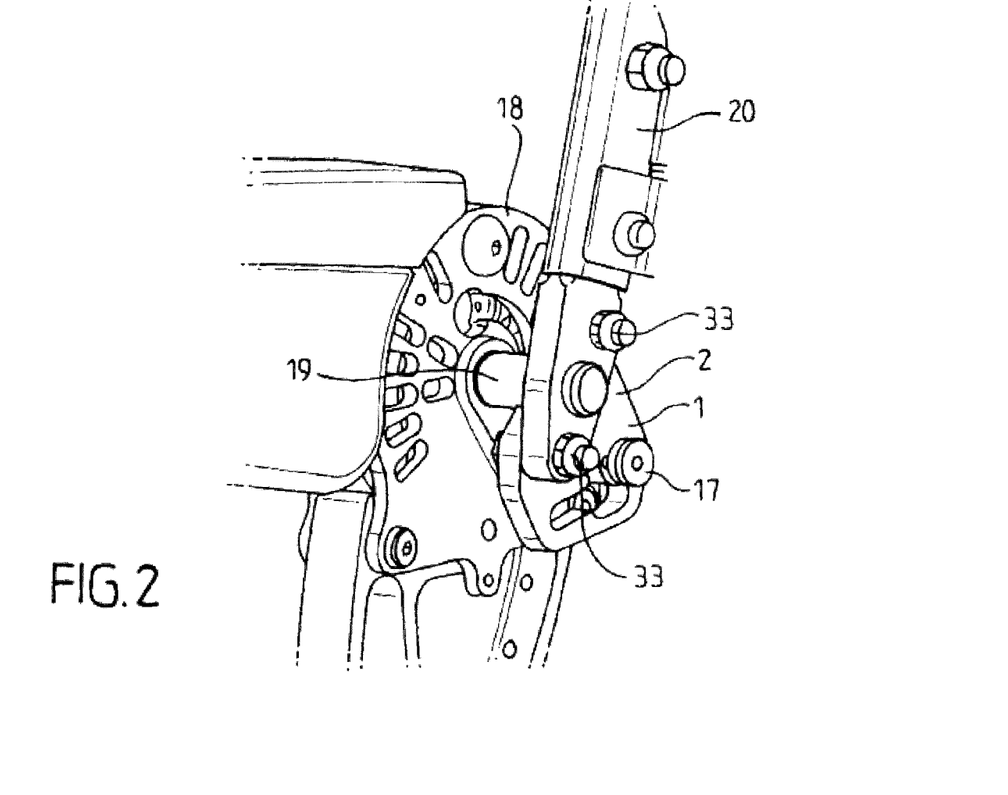
FIG. 2 illustrates a perspective view of a joint of the seat integrating the absorption device according to one embodiment of the invention.
Figure 8:
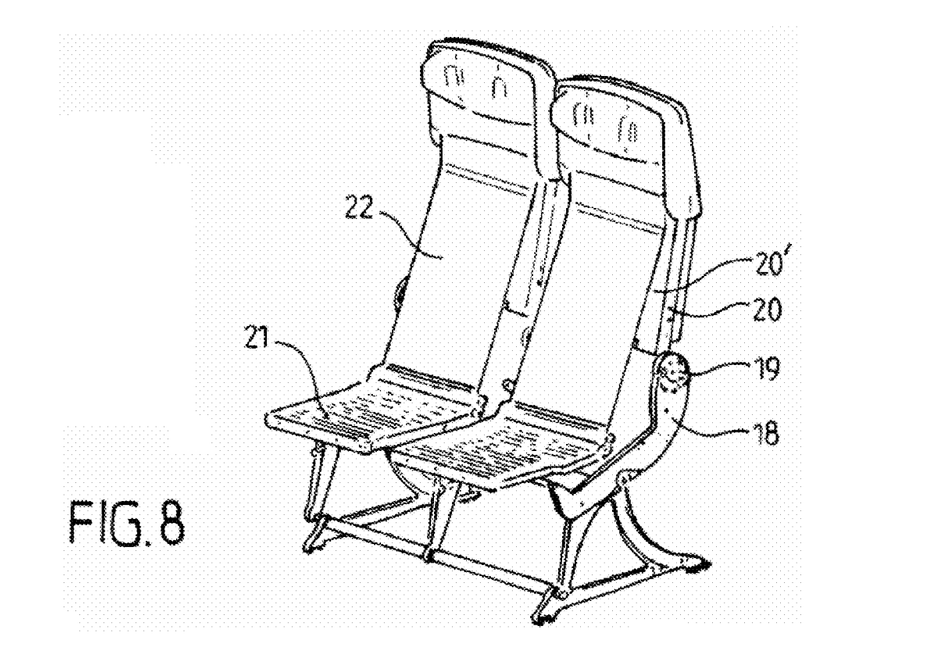
FIG. 8 illustrates a perspective view on the seat of FIG. 7 with the back tilted.
Figure 11:
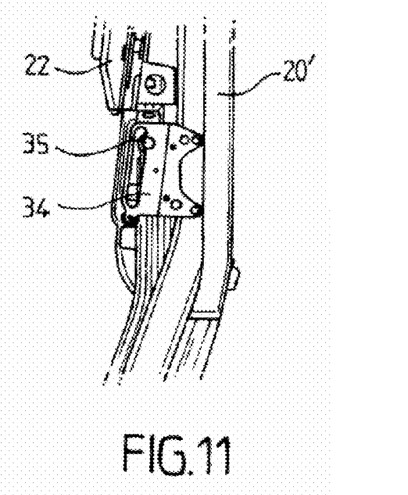
FIG. 11 illustrates an elevational view of the rear connection between the mobile seat back and the fixed back in the seat of FIG. 7.

FIG. 2 shows a joint of an airplane seat including the absorption device 1, the plate 2 of which is shown in FIG. 1. The seat includes a fixed structure 18 on which a pivoting shaft 19 is fixed. The connecting rod 20 is positioned on each side of the seat to rotate about the pivot shaft 19. A fixed back 20' integral with the connecting rods 20 is positioned between the two connecting rods 20 (FIGS. 8 and 11). The absorbing shaft 17 of the device 1 is fixed to the fixed structure 18. The plate 2 of the device is connected to the connecting rod 20 through two fixing holes 3 and 3' so that the plate 2 is integrated with the connecting rod 20.

Figures 3, 4, 5:
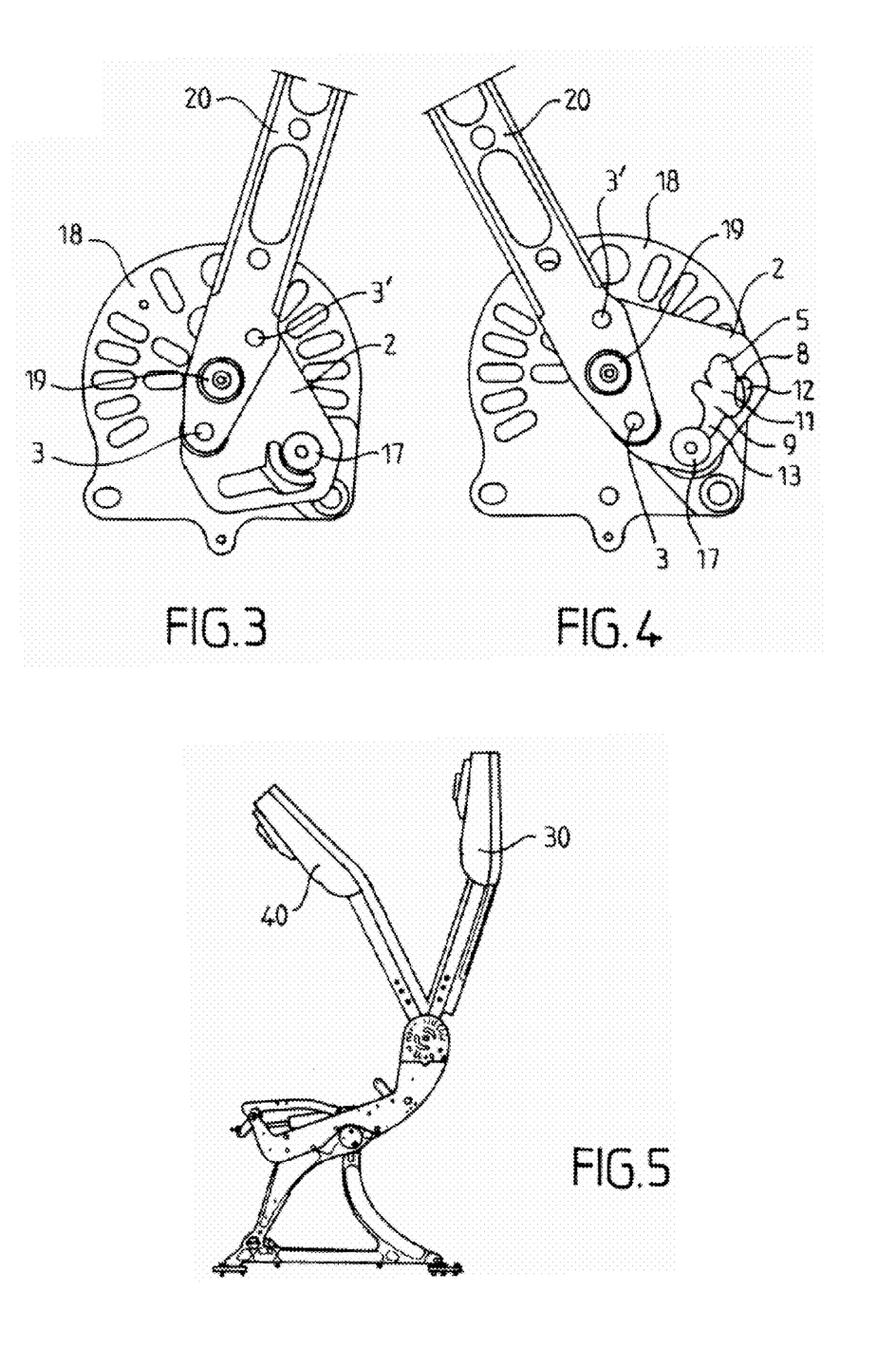
FIG. 3 illustrates an elevational view of the joint of FIG. 2 in the normal operating position.
FIG. 4 illustrates an elevational view of the joint of FIG. 2 after a shock.
FIG. 5 illustrates an elevational view of a seat including the joint of FIGS. 3 and 4.

FIG. 3 shows the joint of FIG. 2 in the absence of a shock. In that configuration, the absorbing shaft 17 is in the hole 5 of the plate 2, which prevents the plate/back assembly from pivoting about the pivoting shaft 19. The seat back 22 is then held in the position indicated by 30 in FIG. 5.

In response to a shock causing a stress on the bridge 10 that is greater than a predetermined threshold value, the bridge 10 breaks at the level of the upper crack initiation zone 7. The broken bridge 10 then gets folded at the level of the lower crack initiation zone 8 and it comes to the storage zone 12 of the brake cavity 9, as shown in FIG. 4. The plate/back assembly is held only by the absorbing shaft 17 and it can then pivot about the pivot shaft 19. First, the rotation of the plate/back assembly is free as the absorbing shaft 17 breaks through the bridge 10 and into the central cavity 11 of the brake cavity 9. Then, the absorbing shaft 17 meets the deformable zone 13, which slows down the rotation of the plate/back assembly as the kinetic energy of the rotation is used to deform the deformable zone 13 so that the absorbing shaft 17 can penetrate into the deformable zone 13. Finally, the absorbing shaft 17 meets the end wall 16 of the brake cavity 9 against which it abuts and stops the rotation of the plate/back assembly about the pivoting shaft 19. The joint is then in the configuration shown in FIG. 4 and the seat back 22 is in the configuration indicated by 40 in FIG. 5. In that position, the seat back 22 is tilted frontward along an angle approximately equal to 45°.

Figure 6:
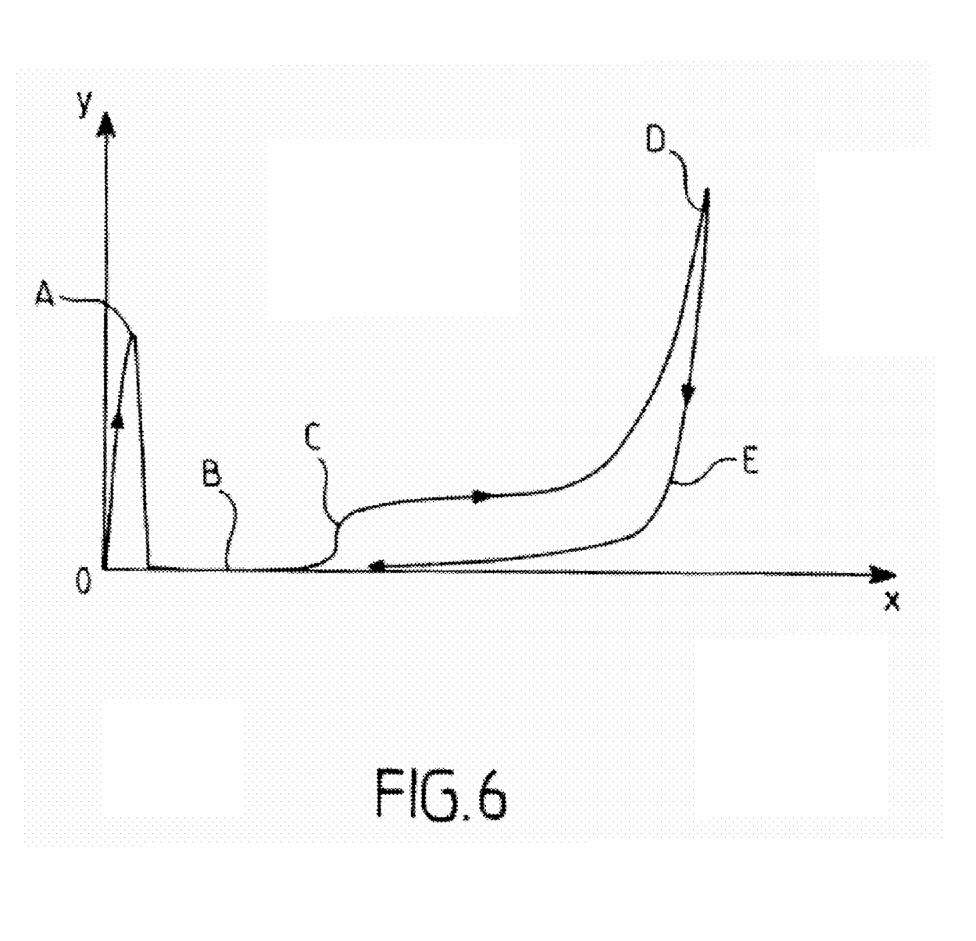
FIG. 6 is a diagram showing the evolution of the stress exerted by the absorbing shaft onto the bridge when the seat back is tilted.

The stresses exerted on the seat back 22 during a shock are shown in FIG. 6. The Y-axis shows the stresses exerted on the seat back 22 as a function of the tilting of the seat back 22 shown by the X-axis. The shock occurs at point 0. Initially, the stresses increase without the of seat back 22 tilting significantly. At point A, the stresses exerted on the bridge 10 exceed the predetermined value, which causes the breaking of the bridge 10 and a resulting relief of the stresses. Then, the plate/back assembly pivots at point B since rotation is no longer hindered by the absorbing shaft 17. That rotation continued until the absorbing shaft 17 meets the deformable zone 13 at point C, which causes a gradual increase in the stresses exerted on the seat back 22 as the absorbing shaft 17 deforms the deformable zone 13 to enable the continued rotation of the seat back 22. The seat back continues rotating up to point D, where the absorbing shaft 17 reaches the end wall 16 of the deformable zone 13, which stops the rotation of the plate/back assembly and thus of the seat back 22.

To return the seat back 22 to its initial position 30 (FIG. 5), the seat back may be manually pushed backward to that position. The reverse rotation of the seat back 22 can be achieved with minimal effort, as can be seen by the stress curve E in FIG. 6 since the deformable zone 13 is already deformed and the width thereof thus enlarged.

Figure 7:
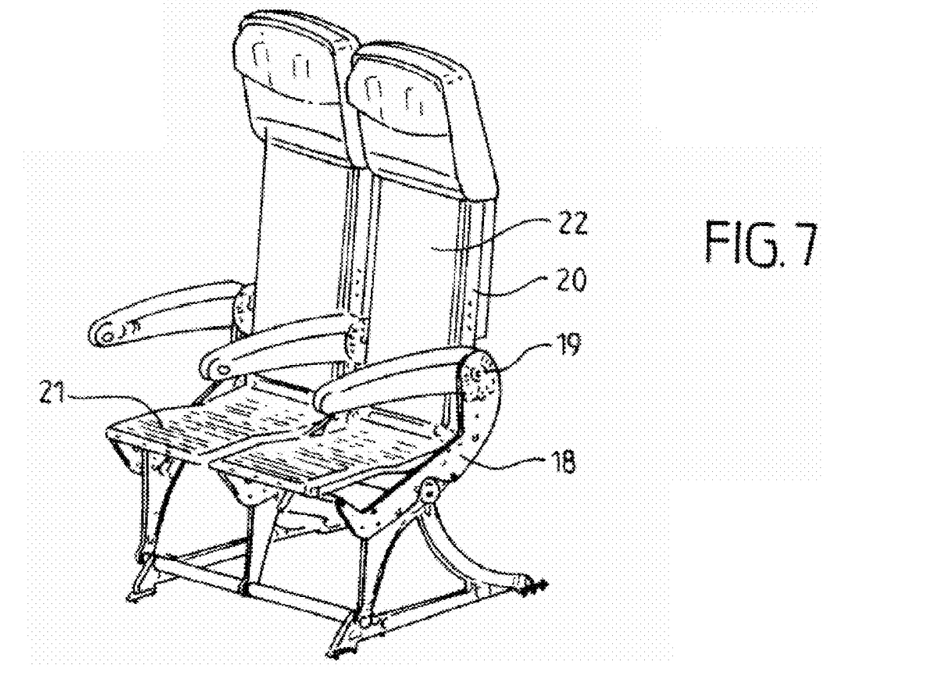
FIG. 7 illustrates a perspective view of a seat with a mobile seat back including the absorption device of FIG. 1.

As shown in FIGS. 7 through 12, the fixed structure 18 may extend below a mobile seating part 21. In that embodiment, the mobile seating part 21 can slide longitudinally on the fixed structure 18 and the seat back 22 is connected to the fixed back 20' and to the mobile seating part 21, the tilting of which is variable as can be seen in FIGS. 7 and 8. The seat is configured so the passenger can choose the angle of the mobile seat back 22 with respect to the mobile seating part 21 as part of the normal operation of the seat. The mechanism that makes it possible for the passenger to simultaneously adjust the tilting of the mobile seat back 22 and the sliding of the seating part 21 are performed by a jacking cylinder 23 positioned between the underside of the seating part 21 and the fixed structure 18.

Figure 12:
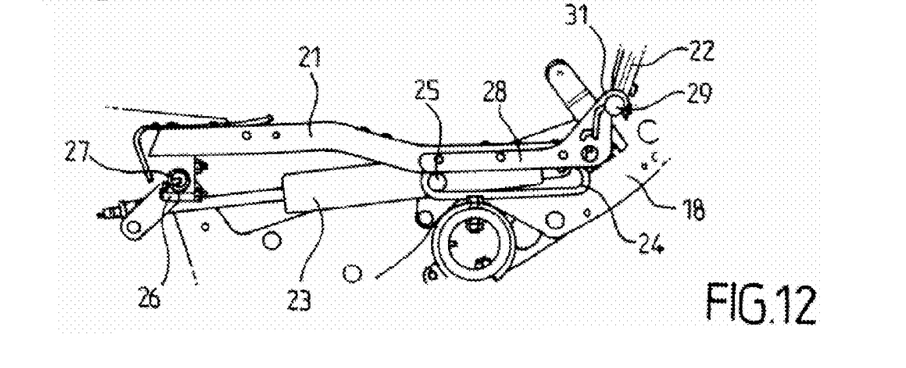
FIG. 12 illustrates an elevational view of the connection of the seating part of FIG. 7 to the fixed structure.

The connection between the mobile seating part 21 and the fixed structure 18 is shown in FIG. 12. The mobile seating part 21 is connected at the front of the fixed structure 18 by an oblong opening 26 which is integral with the mobile seating part 21 in which slides a pad 27 that is integral with the fixed structure 18. In addition, the rear part of the mobile seating part 21 also includes an oblong opening 24 in which a roller 25 of the fixed structure 18 rolls. The jacking cylinder 23 makes it possible to longitudinally translate the mobile sitting part 21 with respect to the fixed structure 18.

Figure 9:
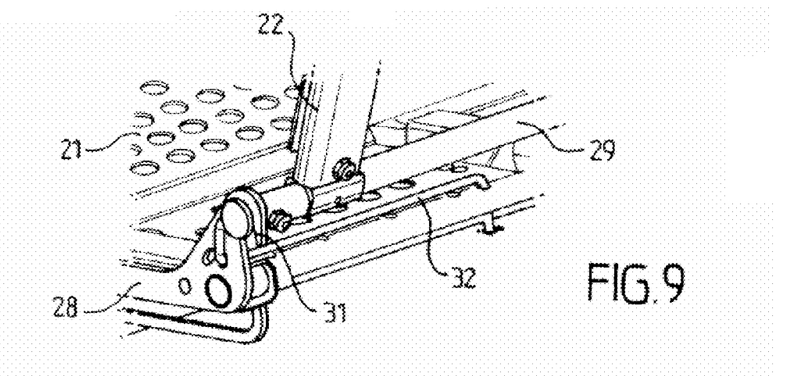
FIG. 9 illustrates a perspective view of the joint of the seat of FIG. 7.
Figure 10:
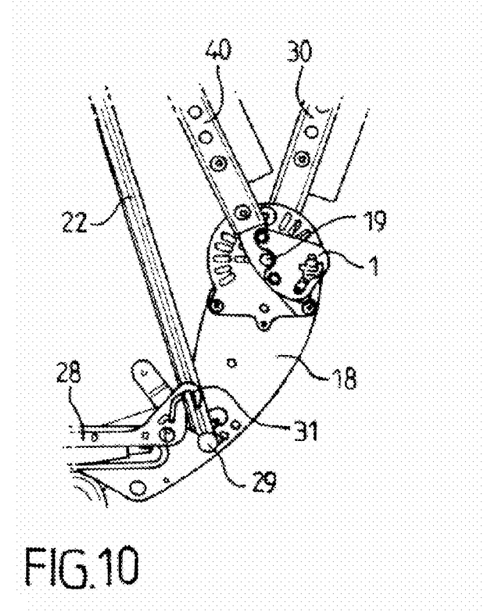
FIG. 10 illustrates an elevational view of the joint of the seat of FIG. 7 after the tilting frontward.

The connection between the mobile seat back 22 and the mobile seating part 21 is shown in FIGS. 9, 10, and 12. A frame 28 including a recess 31, which is open in the lower part thereof so that it has the shape of a hook, is connected to the mobile seating part 21. A releasable shaft 29 integral with the mobile seat back 22 is accommodated in that open recess 31 so it can pivot. Thus, the angle of the mobile seat back 22 with respect to the seating part 21 can vary. A torsion spring 32 (FIG. 9) holds the releasable shaft 29 in the open recess 31 during normal operation of the seat. The torsion spring 32 extends transversally between the releasable shaft 29 and the fixed structure 18 and it has the shape of a "Z".

In addition, the mobile seat back 22 is connected to the fixed back 20' by a roller 35 (FIG. 11) that is integral with the mobile seat back 22 and adapted to roll in an oblong opening in an attaching portion 34 integrated with the fixed back 20'. That connection makes it possible for the mobile seat back 22 to move vertically with respect to the fixed back 20'.

When the shock absorption device 1 is triggered and enables the fixed back 20' to switch from position 30 to position 40 as shown in FIG. 10, the fixed back 20' rests on the mobile seat back 22 at the top of the oblong opening in the attaching portion 34 and the mobile seat back 22 slides downward. The releasable shaft 29 also slides downward so that the stress exerted by the fixed back 20' on the mobile seat back 22 causes the releasable shaft 29 to pop out of the open recess 31 in the frame 28 despite of the resistance provided by the torsion spring 32. That pivoting connection between the mobile seat back 22 and the fixed back 20' enables the device 1 to function as described above even in the presence of a variably angled back.

Other variants of the present invention are also possible. For example, the plate 2 and the connecting rod 20 can be provided in only one integral piece, which makes it possible to simplify the mounting of the joint. However, that embodiment has the drawbacks of not enabling the adjustment the plate's 2 angle with respect to the connecting rod 20, which can be useful to correct the for any clearance issues due to any manufacturing defects. In addition, the central recess 11 can be shorter or longer as a function of the tilting desired for the seat back 22. Similarly, the deformable zone 13 can shorter or longer as a function of the tilting and the damping velocity desired.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A shock absorption device comprising:
an absorbing shaft having a diameter; and
a plate, the plate comprising a brake cavity and a hole separated by a bridge,
wherein the hole includes a central recess in which the absorbing shaft is placed and upper and lower crack initiation zones that make the bridge locally thinner, the bridge being thinner at one of the two crack initiation zones,
wherein the dimensions of the bridge are such that it breaks at the thinner crack initiation zone when the absorbing shaft exerts a force thereon that is greater than a predetermined value, and
wherein the brake cavity includes a central cavity, a storage zone intended to receive the broken bridge, and a deformable zone extending along a reference axis and having a width that is smaller than the diameter of the absorbing shaft and is adapted to receive and be deformed by the absorbing shaft when the bridge is broken.

2. A shock absorption device according to claim 1, wherein the plate is made of aluminum.

3. A shock absorption device according to claim 1, wherein the bridge is thinner at the upper crack initiation zone than at the lower crack initiation zone.

4. A shock absorption device according to claim 1, wherein the reference axis is curved.

5. A shock absorption device according to claim 1, wherein the deformable zone is curved and has a length and a curvature such that it allows a seat back to tilt along an angle between 40° and 50°.

6. A shock absorption device according to claim 1, wherein the deformable zone has a width between 80% and 98% of the diameter of the absorbing shaft.

7. A shock absorption device according to claim 1, wherein the deformable zone has a decreasing width as it extends away from the bridge along the reference axis.

8. A shock absorption device according to claim 1, wherein the central recess is disk-shaped with a diameter that is substantially equal to that of the absorbing shaft.

9. A shock absorption device according to claim 1, wherein the central recess has a center located on the reference axis; and
the upper and lower crack initiation zones each include a center of curvature located on a periphery of the central recess,
wherein the centers of the upper and lower crack initiating zones are separated by an angle between 80° and 120° with respect to the center of the central recess.

10. A shock absorption device according to claim 1, wherein
the upper and lower crack initiation zone are each concave toward the central recess.

11. A shock absorption device according to claim 1, further comprising
a means for the fastening the plate to a fixed part.

12. A shock absorption device according to claim 11, further comprising a means for adjusting an angle of the absorption device with respect to the fixed part.

13. A shock absorption device according to claim 1, further comprising a fixed structure;

a pivot shaft fixed on the fixed structure; and a back in pivoting relation with the pivot shaft.

14. A shock absorption device according to claim 13, wherein the plate is integral with the back; and the absorption shaft is connected to the fixed structure.

15. A shock absorption device according to claim 14, wherein the back includes at least one connecting rod, one end of which is in pivoting relation with the pivot shaft; and the plate is connected to the connecting rod.

16. A shock absorption device according to claim 15, wherein the seat further includes a seating part that can translate longitudinally with respect to the fixed structure; and a mobile back in annular linear relation with respect to the back, the mobile back being further in pivoting relation about a releasable shaft with respect to the seating part;

wherein the pivoting relation between the seating part and the mobile part is provided by an open frame that is integral with the seating part in which the releasable shaft pivots, and wherein the open frame is closed by a torsion spring that is adapted to release the releasable shaft from the open frame when the bridge breaks.

17. A shock absorption device according to claim 16, wherein the annular linear connection between the mobile back and the back is provided by a roller attached to the mobile back that slides in an oblong part attached to the back.

18. A shock absorption device according to claim 16, further comprising a jacking cylinder connected to the seating part and to the fixed structure making it possible to simultaneously adjust an angle of the mobile back about the releasable shaft and the translation of the seating part with respect to the fixed structure.

* * * * *